United States Patent [19]
Foulletier et al.

[11] 3,758,587
[45] Sept. 11, 1973

[54] NEW POLYFLUORINATED AMINOALCOHOLS

[75] Inventors: Louis Foulletier, Oullins; Jean-Pierre Lalu, La Mulatiere, both of France

[73] Assignee: Ugine Kuhlmann, Paris, France

[22] Filed: Dec. 15, 1969

[21] Appl. No.: 885,257

[30] Foreign Application Priority Data
Dec. 17, 1968    France .............................. 68178566

[52] U.S. Cl. ...... 260/584 R, 260/563 R, 260/563 C, 260/573
[51] Int. Cl. ............................................. C07c 91/06
[58] Field of Search ................... 260/584 R, 583 GG

[56]    References Cited
    UNITED STATES PATENTS
3,663,604    5/1972    Blochl ........................ 260/584 R X
3,549,698    12/1970    Coon ................................. 260/584
3,134,816    5/1964    Scott ................................. 260/583

FOREIGN PATENTS OR APPLICATIONS
677,907    1/1964    Canada .............................. 260/583

OTHER PUBLICATIONS
Wagner & Zook, Synthetic Organic Chemistry, John Wiley & Sons, Inc.: New York, 1953, pgs. 666–670.

Primary Examiner—Lewis Gotts
Assistant Examiner—C. F. Warren
Attorney—Pennie, Edmonds, Morton, Taylor and Adams

[57] ABSTRACT

Polyfluorinated aminoalcohols having the following general formula:

(I)

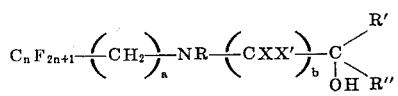

in which:
$C_nF_{2n+1}$    represents    a    straight    or    branched perfluorinated hydrocarbon chain and in which $n$ represents a whole number between one and 20; $a$ is an even number of two or four; R represents a hydrogen atom, an alkyl radical containing from one to nine carbon atoms, a cycloalkyl radical containing from five to nine carbon atoms or an aryl radical containing from six to ten carbon atoms; X and X' represent a hydrogen atom or an alkyl radical containing from one to four carbon atoms in which X and X' can be identical or different; $b$ is a whole number between one and four; R' represents a hydrogen atom or an alkyl radical having one to four carbon atoms and R'' is an alkyl radical having from one to nine carbon atoms, and to a process for preparing the products of formula (I) which comprises reacting an amino-alcohol having the following general formula:

(II)

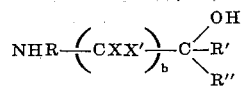

with a polyfluoroalkane halide having the following general formula;

(III) $C_nF_{2n+1} + CH_2 +_a Y$ in which Y represents bromine or iodine and in which $n$, $a$, R, X, X', $b$, R', R'' correspond to the definitions given above at a temperature of between about 0° and 200° C in the presence of a solvent according to the following equation:

(IV)

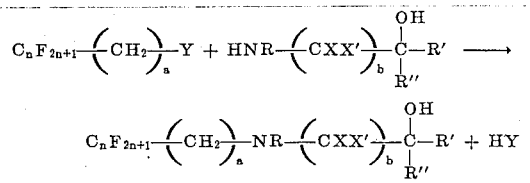

5 Claims, No Drawings

NEW POLYFLUORINATED AMINOALCOHOLS

The polyfluorinated aminoalcohols of this invention have very advantageous and varied uses and applications. The products of this invention for example are useful in the textile, leather and paper industries and can be admixed with or added to numerous plastic and resinoud compositions. When added to or admixed with plastic or resinous compositions they act as plasticizing agents and impart auto-lubricating properties to the plastic and resinous compositions to improve their surface properties. The polyfluorinated aminoalcohols of this invention are especially valuable and advantageous as tensio-active or surface active agents. The compounds act as surface active agents in many different media including water, organic solvents, diluted or concentrated acids or diluted or concentrated alkalis. The products of this invention are also excellent leveling agents and when incorporated into viscous products such as waxes, greases, varnishes and paints they significantly improve the leveling thereof when applied to a surface. The products also improve the "spreading out" properties of such viscous products upon application.

SUMMARY OF THE INVENTION

This invention broadly relates to polyfluorinated aminoalcohols having the following general formula:

(I)
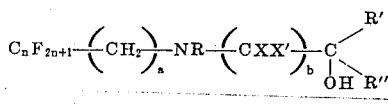

in which $C_nF_{2n+1}$ represents a straight or branched perfluorinated hydrocarbon chain and in which $n$ represents a whole number between one and 20; $a$ is an even number of two or four; R represents a hydrogen atom, an alkyl radical containing from one to nine carbon atoms; a cycloalkyl radical containing from five to nine carbon atoms or an aryl radical containing from six to 10 carbon atoms; X and X' represent a hydrogen atom or an alkyl radical containing from one to four carbon atoms and in which X and X' can be identical or different; b is a whole number between one and four; R' represents a hydrogen atom or an alkyl radical having one to four carbon atoms and R'' is an alkyl radical having from one to nine carbon atoms, and to a process for preparing the products of formula (I) which comprises reacting an aminoalcohol having the following general formula:

(II)
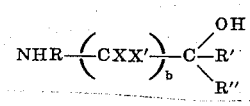

with a polyfluoralkane halide having the following general formula:

(III) $C_nF_{2n+1}$ -(-$CH_2$-)$_a$Y in which Y represents bromine or iodine and in which $n$, $a$, R, X, X', $b$, R', R'' correspond to the definitions given above at a temperature of between about 0° to 200° C in the presence of the solvent according to the following equation:

(IV)
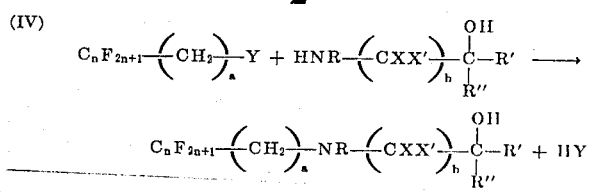

Compounds coming within the scope of the general formula (I) in which $n$ is a number between six and 12 and particularly between six and eight and in which $b$ is one or two have exceptional and unobvious properties as hereinafter disclosed.

The alkyl, cycloalkyl and aryl radicals disclosed herein are hydrocarbon, alkylcycloalkyl and aryl radicals.

Various solvents for the aminoalcohols can be used in carrying out process according to this invention, and it is advantageous to use a solvent which has a boiling temperature below about 200° C. Some examples of solvents which can be used according to this invention include halogenated hydrocarbons having between about one to four carbon atoms such as fluorinated, chlorinated, fluoro-chlorinated hydrocarbons. As specific and advantageous halogenated hydrocarbon solvents include chloroform, carbon tetrachloride, methylene chloride, ethylene chloride, 1-1-dichloroethylene, difluorotetrachloroethane, trichlorotrifluroethane and so forth.

Additional solvents that can be used according to this invention include primary, secondary and tertiary alcohols having from one to about 10 carbon atoms, for example, $n$-butanol, isobutanol, $n$-pentanol, isopenanol, $n$-hexanol, 2-heptanol, n-heptanol, n-octanol; aliphatic, cyclic, heterocyclic and aromatic ethers such as ethyl, propyl, and isopropyl ethers, dioxan, tetrahydrofuran, tetrahydropyrone, and anisole; aliphatic, cyclic, and aromatic ketones such as 2-butanone, 2-pentanone, 3-pentanone, cyclohexanone and acetophenone; aliphatic and aromatic esters such as propyl formate, methyl acetate, ethyl acetate, butyl acetate, phenyl acetate, methyl benzoate, and ethyl benzoate; and aprotic solvents such as dimethylformamide, dimethylsulfphoxide and hexamethylphosphorotriamide.

The process of this invention can be carried out quite simply by mixing an aminoalcohol according to formula (II) with a polyfluoroalkane halide according to formula (III) together with a suitable solvent and heating the mixture for a brief time to complete the reaction to form the novel compounds according to formula (I). The exact temperature used to carry out the reaction can be varied quite widely from about 0° to 200° C depending upon the particular aminoalcohol, polyfluoroalkane halide and solvent being employed to carry out the reaction. It has been found most of the reactions that can advantageously be carried out according to this invention at a temperature from between about 90° to 120° C. The exact temperature and time used for carrying out the reaction can be determined by routine experimentation by one skilled in the art. After the reaction has been completed the products of this invention can be recovered therefrom by various means including distillation, decantation and/or extraction depending upon the particular materials being reacted and the particular solvent employed as the reaction medium.

After the reaction has been completed, it is generally advantageous to remove the majority of the solvent by distillation, add an alkali such as sodium hydroxide to the residue of the distillation and extract the products of this invention with a suitable solvent for the product being produced such as ethyl ether. The extract can then be dried, for example on a hydrous sodium sulphate, and the extract distilled.

The polyfluorinated aminoalcohols of this invention have very advantageous and varied uses and applications. The products of this invention for example are useful in the textile, leather and paper industries and can be admixed with or added to numerous plastic and resinous compositions. When added to or admixed with plastic or resinous compositions they act as plasticizing agents and impart auto-lubricating properties to the plastic and resinous compositions to improve their surface properties. The polyfluorinated amino alcohols of this invention are especially valuable and advantageous as tensio-active or surface active agents. The compounds act as surface active agents in many different media including water, organic solvents, diluted or concentrated acids and diluted or concentrated alkalis. The products of this invention are also excellent leveling agents and when incorporated into viscous products such as waxes, greases, varnishes and paints they significantly improve the leveling thereof when applied to a surface. The products also improve the "spreading out" properties of such viscous products upon application.

Products of exceptional value and having particularly unexpected properties are the polyfluorinated aminoalcohols in which $n$ is between eight and six, $a$ is two or four, R is hydrogen, X and X' are both hydrogen, $b$ is one or two, R' is hydrogen and R'' is a methyl radical. For example the following compounds

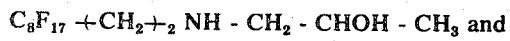

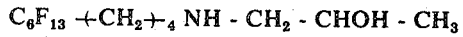

when added to water in a concentration of 100 ppm lowers the surface tension of the water at 18° C to 28.3 dymes/cm and 30.3 dymes/cm respectively.

The following examples illustrate some specific processes according to this invention. In all of the following examples when a fraction contains several constituents the percentages given are molar percentages of the various compounds and the yields reported are based on the starting fluorinated material.

EXAMPLE 1

A mixture of 37.4 g (0.1 mole) $C_4F_9$-$C_2H_4$-I 30 g (0.4 mole) of amino-1-propanol-2 and 100 cc of amyl alcohol were charged into a suitable reaction vessel and heated for four hours at 120° C under constant stirring. After the reaction was completed after four hours the mixture was stirred with 50 cc of a 10 percent by weight aqueous sodium hydroxide solution and the resulting solution extracted four times with 50 cc of ethyl ether. The ethereal extracts were then dried on anhydrous sodium sulphate and distilled to yield the following three fractions:

a. Fraction up to 35° comprised ethyl ether and $C_4F_9$-$CH=CH_2$ (21 mmoles);
b. Fraction 75°/50 mm Hg comprised amyl alcohol;
c. Fraction 95°/6 mm Hg 18.3 g was $C_4F_9$ - $C_2H_4$ - NH - $CH_2$ - CHOH - $CH_3$ (57 mmoles). This product has a melting point approaching 45°.

$C_4F_9$ - $C_2H_4$ - NH - $CH_2$ - CHOH - $CH_3$ isolated with a yield of 57 percent.

EXAMPLE 2

47.4 g (0.1 mole) of $C_6F_{13}$-$C_2H_4$-I, 30 g (0.4 mole) of amino-1-propanol-2 and 100 cc of amyl alcohol were charged into a suitable vessel and heated at 110° C for 4 hours under constant stirring. After the 4 hours reaction period and the reaction was completed the majority of the amyl alcohol was removed therefrom by distillation. The azeotrope amyl alcohol $C_6F_{13}$-CH = $CH_2$ was removed at the beginning of the distillation. 3.4 g of this olefin was collected by decantation. The residue of the distillation was stirred with 50 cc of a 10 percent by weight aqueous solution of sodium hydroxide and the resulting solution extracted four times with 50 cc of ethyl ether. The ethereal extracts were dried on anhydrous sodium sulfate and then distilled. During the distillation the ethyl ether and amyl alcohol was first recovered and 27.2 g of $C_6F_{13}$ - $C_2H_4$ - NH - $CH_2$ CHOH - $CH_3$ was collected at 109° C/4 mm. The conversion rate of the amino alcohol recovered was 64.5 percent.

EXAMPLE 3

57.4 g (0.1 mole) of $C_8F_{17}$-$C_2H_4$-I, 30 g (0.4 mole) of amino-1-propanol-2 and 100 cc of amyl alcohol were charged into a suitable reaction vessel and heated at 110° C for 4 hours under constant stirring. The reaction mixture was then distilled and the following fraction plus a residue was obtained:

a. Fraction 105° C/200 mm: 13.4 g comprising the olefin $C_8F_{17}$-CH = $CH_2$ (30 mmoles) and
b. Fraction 75° C/50 mm: comprising amyl alcohol The residue was then stirred with 50 cc of a 10 percent by weight aqueous sodium hydroxide solution and the resulting solution extracted four times with 50 cc of ethyl ether. The ethereal extracts were dried on anhydrous sodium sulfate and then distilled. The ethyl ether and amyl alcohol was first obtained by the distillation and 31.8 g of $C_8F_{17}$ - $C_2H_4$ - NH - $CH_2$ - CHOH - $CH_3$ at 114° C/1-2 mm were recovered. This fluorinated amino alcohol was isolated with a conversion rate of 61 percent and had a melting point approaching 73° C.

EXAMPLE 4

60 grams (0.89 mole) of $C_{10}F_{21}$ - $C_2H_4$ - I, 27 grams (0.36 mole) of amino-1-propanol-2 and 90 cc of amyl alcohol were charged into a suitable reaction vessel and heated at 130° C for 4 hours under constant stirring. The reaction mixture was then stirred with 50 cc of a 10 percent by weight sodium hydroxide aqueous solution. The resulting solution was extracted four times with 50 cc of ethyl ether. The ethereal extracts were then dried on anhydrous sodium sulfate and the ethereal extracts distilled to obtain the following three fraction and residue:

a. Fraction 50°C/20 mm ; this fraction is an azeotrope comprising amyl alcohol and $C_{10}F_{21}$ - CH = $CH_2$. This olefin (11.5 g) has been isolated by decantation.
b. Fraction 55° C/20 mm ; comprising amyl alcohol
c. Fraction 123° C/1 mm ; 36.4 g of $C_{10}F_{21}$ - $C_2H_4$ - NH - $CH_2$ - CHOH - $CH_3$
d. Residue 4.2 g ; non-identified solid.

The aminoalcohol was isolated with a conversion rate of 66 percent.

EXAMPLE 5

40.2 grams (0.1 mole) of $C_4F_9-(C_2H_4)_2 I$, 30 grams (0.4 mole) of amino-1-propanol-2 and 100 cc of amyl alcohol were charged into a suitable reaction vessel and heated at 130° C for 4 hours under constant stirring. The reaction mixture was then distilled to remove the amyl alcohol. The residue was then stirred with 50 cc of a 10 percent by weight sodium hydroxide aqueous solution and the resulting solution extracted four times with 50 cc of ethyl ether. The extracts were then dried on anydrous sodium sulfate and the ethereal extracts distilled. The distillation first removed the ethyl ether and a small amount of amyl alcohol and 27.2 grams of $C_4F_9-(C_2H_4)_2 NH-CH_2CHOH-CH_3$, were obtained at 103° C/4mm and 2 grams of a non-identified solid residue remained. The above aminoalcohol was obtained with the yield of 78 percent.

EXAMPLE 6

50.3 grams (0.1 mole) of $C_6F_{13}-(C_2H_4)_2 I$, 30 grams (0.4 mole) of amino-1-propanol-2 and 100 cc of amyl alcohol were charged into a suitable reaction vessel and heated at 115° C for 4 hours under constant stirring. The reaction mixture was then stirred with 50 cc of a 10 percent by weight sodium hydroxide aqueous solution and the resulting solution extracted four times with 50 cc of ethyl ether. The extracts were then dried on anhydrous sodium sulfate and the ethereal extracts distilled. The ethyl ether and a small amount of amyl alcohol were first removed by the distillation and 36.1 grams of $C_6F_{13}-(C_2H_4)_2 NH-CH_2 CHOH-CH_3$, were collected at 124° C/4mm. The aminoalcohol was recovered with a yield of 80.5 percent.

EXAMPLE 7

30.1 grams (0.05 mole) of $C_8F_{17}-(C_2H_4)_2 I$, 15 grams (0.20 mole) of amino-1-propanol-2 and 50 cc of amyl alcohol were charged into a suitable reaction vessel and heated at 115° C for 4 hours under constant stirring. The mixture was then stirred with a 10 percent by weight sodium hydroxide aqueous solution and the resulting solution extracted four times with 50 cc of ethyl ether. The extracts were then dried on anhydrous sodium sulfate and the ethereal extracts distilled. The distillation first removed the ethyl ether and amyl alcohol and 25 grams of $C_8F_{17}(C_2H_4)_2 NH-CH_2-CHOH-CH_3$ were collected at 110° C/1mm. The aminoalcohol was recovered with a yield of 91 percent.

EXAMPLE 8

47.4 grams (0.1 mole) of $C_6F_{13}-C_2H_4-I$, 36 grams (0.4 mole) of methylamino-1-propanol-2 and 100 cc of amyl alcohol were charged into a suitable reaction vessel and heated at 90° C for 4 hours under constant stirring. The resulting reaction mixture was then stirred with 50 cc of a 10 percent by weight sodium hydroxide aqueous solution and the resulting solution extracted four times with 50 cc of ethyl ether. The extracts were then dried on anhydrous sodium sulfate and the ethereal extracts distilled. The distillation resulted in the removal of the ethyl ether and the amyl alcohol and 32 grams of $C_6F_{13}-C_2H_4-N(CH_3)-CH_2-CHOH-CH_3$, were collected at 107° C/9mm. The above aminoalcohol is a viscous liquid and was recovered with a yield of 73.5 percent.

EXAMPLE 9

47.4 grams (0.1 mole) of $C_6F_{13}-C_2H_4-I$, 49 grams (0.31 mole) of cyclohexylamino-1-propanol-2 and 100 cc of amyl alcohol were charged into a suitable reaction vessel and heated at 90° C for 4 hours under constant stirring. The mixture was then distilled and the following fractions and residue were obtained:

a. Fraction 52° C/200 mm. This fraction is an azeotrope comprising amyl alcohol and $C_6F_{13}-CH=CH_2$. This olefin (13.8 g ; 40 mmoles) was isolated by decanation.

b. Fraction 88° C/100 mm constituted of amyl alcohol c. Residue

The above residue was then stirred with 50 cc of a 10 percent by weight sodium hydroxide aqueous solution and the resulting solution extracted four times with 50 cc with ethyl ether. The ethereal extracts were then dried on anhydrous sodium sulfate and distilled. The distillation resulted in the collection of ethyl ether and the following two fractions:

e. Fraction 90° C/3-4 mm Hg 9 g comprising amyl alcohol (34.8 percent) and of cyclohexylamino-1-propanol-2 (65.2 percent)

f. Fraction 125° C/1 mm 25.7 g comprising amyl alcohol (6 percent) and of

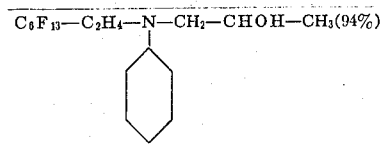

The above amino alcohol was recovered with a yield of 50.5 percent.

We claim:

1. Compounds having the following general formula:

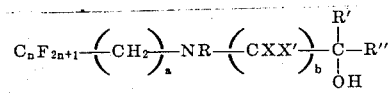

in which:

$C_nF_{2n+1}$ represents a straight or branched perfluorinated hydrocarbon chain and in which n represents a whole number between one and 20; a is an even number of two or four; R represents a hydrogen atom, or an alkyl radical containing from one to nine carbon atoms; X and X' represent a hydrogen atom or an alkyl radical containing from one to four carbon atoms and in which X and X' can be identical or different; b is a whole number between one and four; R' represents a hydrogen atom or an alkyl radical having one to four carbon atoms and R'' is an alkyl radical having from one to nine carbon atoms.

2. Compounds according to claim 1 in which n is a number between six and 12.

3. Compounds of claim 1 in which n is a number between six and eight and b is one or two.

4. The compound $C_8F_{17}-(CH_2)_2 NH-CH_2-CHOH-CH_3$

5. The compound $C_6F_{13}-(CH_2)_4-NH-CH_2-CHOH-CH_3$

* * * * *

UNITED STATES PATENT OFFICE
CERTIFICATE OF CORRECTION

Patent No. 3,758,587      Dated September 11, 1973

Inventor(s) Louis Foulletier and Jean-Pierre Lalu

It is certified that error appears in the above-identified patent and that said Letters Patent are hereby corrected as shown below:

Column 4, line 4, "C49-C" should read --$C_4F_9$-C--.

Signed and sealed this 25th day of June 1974.

(SEAL)
Attest:

EDWARD M. FLETCHER
Attesting Officer

C. MARCHALL DANN
Commissioner of Patents